US012598266B2

(12) United States Patent
Handa

(10) Patent No.: US 12,598,266 B2
(45) Date of Patent: Apr. 7, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masahiro Handa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 18/174,686

(22) Filed: Feb. 27, 2023

(65) Prior Publication Data

US 2023/0291865 A1 Sep. 14, 2023

(30) Foreign Application Priority Data

Mar. 9, 2022 (JP) ................................ 2022-036404

(51) Int. Cl.

| | |
|---|---|
| ***H04N 5/272*** | (2006.01) |
| ***G06T 7/194*** | (2017.01) |
| ***G06T 15/20*** | (2011.01) |
| ***H04N 5/262*** | (2006.01) |
| ***H04N 5/268*** | (2006.01) |

(52) U.S. Cl.

CPC ............ *H04N 5/272* (2013.01); *G06T 7/194* (2017.01); *G06T 15/205* (2013.01); *H04N 5/2628* (2013.01); *H04N 5/268* (2013.01)

(58) Field of Classification Search

CPC ...... H04N 5/272; H04N 5/2628; H04N 5/268; G06T 7/194; G06T 15/205

See application file for complete search history.

(56) References Cited

U.S. PATENT DOCUMENTS

| | | | | |
|---|---|---|---|---|
| 11,172,185 | B2 | 11/2021 | Uemura | |
| 2019/0221029 | A1* | 7/2019 | Yoneda | G06T 7/70 |
| 2019/0342537 | A1* | 11/2019 | Taya | H04N 23/90 |
| 2019/0349531 | A1 | 11/2019 | Aizawa | |
| 2020/0066028 | A1* | 2/2020 | Umemura | H04N 13/111 |

(Continued)

FOREIGN PATENT DOCUMENTS

| | | | |
|---|---|---|---|
| JP | H11-27577 | A | 1/1999 |
| JP | 2010-278813 | A | 12/2010 |

(Continued)

OTHER PUBLICATIONS

Notice of Reasons for Refusal issued by the Japanese Patent Office on Feb. 13, 2024 in corresponding JP Patent Application No. 2022-036404, with English translation.

(Continued)

*Primary Examiner* — Kee M Tung
*Assistant Examiner* — Khoa Vu
(74) *Attorney, Agent, or Firm* — Carter, DeLuca & Farrell LLP

(57) ABSTRACT

An object is to make it possible to provide an appropriate image. A background combined image that takes, as a foreground, an image corresponding to a virtual viewpoint that is set in an image capturing space and a background combined image that takes, as a foreground, part of a captured image captured from a specific viewpoint among a plurality of captured images are generated. Then, the configuration is designed so that it is possible to selectively output one of the background combined images.

13 Claims, 7 Drawing Sheets

(56) References Cited

U.S. PATENT DOCUMENTS

| | | | | |
|---|---|---|---|---|
| 2020/0258196 | A1* | 8/2020 | Kokura | G06T 3/4076 |
| 2023/0177767 | A1 | 6/2023 | Handa | |

FOREIGN PATENT DOCUMENTS

| | | | |
|---|---|---|---|
| JP | 2012185772 | A | 9/2012 |
| JP | 2017-211828 | A | 11/2017 |
| JP | 2018-107793 | A | 7/2018 |
| JP | 2020-140519 | A | 9/2020 |
| JP | 2021-086189 | A | 6/2021 |
| WO | 2022/014341 | A1 | 1/2022 |

OTHER PUBLICATIONS

Extended European Search Report issued in corresponding EP Patent Application No. 23159341.9, dated Aug. 10, 2023.

* cited by examiner

IMAGE PROCESSING APPARATUS, IMAGE PROCESSING METHOD, AND STORAGE MEDIUM

BACKGROUND

Field

The present disclosure relates to a technique of generating a virtual viewpoint image.

Description of the Related Art

In recent years, a technique has been attracting attention, which generates an image (virtual viewpoint image) representing an appearance from a virtual viewpoint by using a plurality of captured images obtained by arranging a plurality of imaging devices at different positions and performing image capturing in synchronization. The generation of a virtual viewpoint image is implemented by gathering captured images in a server and the like, generating three-dimensional shape data of an object, and performing processing, such as rendering based on the virtual viewpoint.

Generally, by increasing the number of imaging devices to be arranged around an object and performing image capturing with a high resolution, it is possible to generate a virtual viewpoint image of a higher quality. On the other hand, increasing the number of imaging devices and the resolution of the captured image will increase the amount of data, resulting in an increase in the processing load in an image processing system. In this regards, Japanese Patent Laid-Open No. 2017-211828 has disclosed a technique to reduce the amount of data by extracting an object, which is taken as a foreground, from the captured image to create a foreground image and transmitting the foreground image to a server that generates three-dimensional shape data.

With the technique of Japanese Patent Laid-Open No. 2017-211828 described above, it is possible to reduce the amount of data per imaging device. However, it is not necessarily possible to provide an image appropriate to a viewer. For example, the desired image quality may be different between a case where it is desired to view a specific object from a position close thereto and a case where it is desired to view a plurality of objects en bloc. Alternatively, for example, there is a case where it is better to provide an image viewed from a viewpoint at which it is not possible for an actual imaging device to perform image capturing.

SUMMARY

The present disclosure has been made in view of the problem such as this and an object of the present disclosure is to provide a technique capable of outputting an appropriate image.

The image processing apparatus according to the present disclosure includes one or more memories storing instructions; and one or more processors executing the instructions to: obtain a foreground image included in a captured image obtained by a specific imaging device performing image capturing and indicating an area of a foreground; obtain a virtual viewpoint image generated based on a plurality of captured images obtained by a plurality of imaging devices performing image capturing and indicating an area of a foreground; and output at least one of a first image generated based on the foreground image and a background image and a second image generated based on the virtual viewpoint image and the background image.

Further features of the present disclosure will become apparent from the following description of exemplary embodiments with reference to the attached drawings.

DESCRIPTION OF THE EMBODIMENTS

Figure 1:
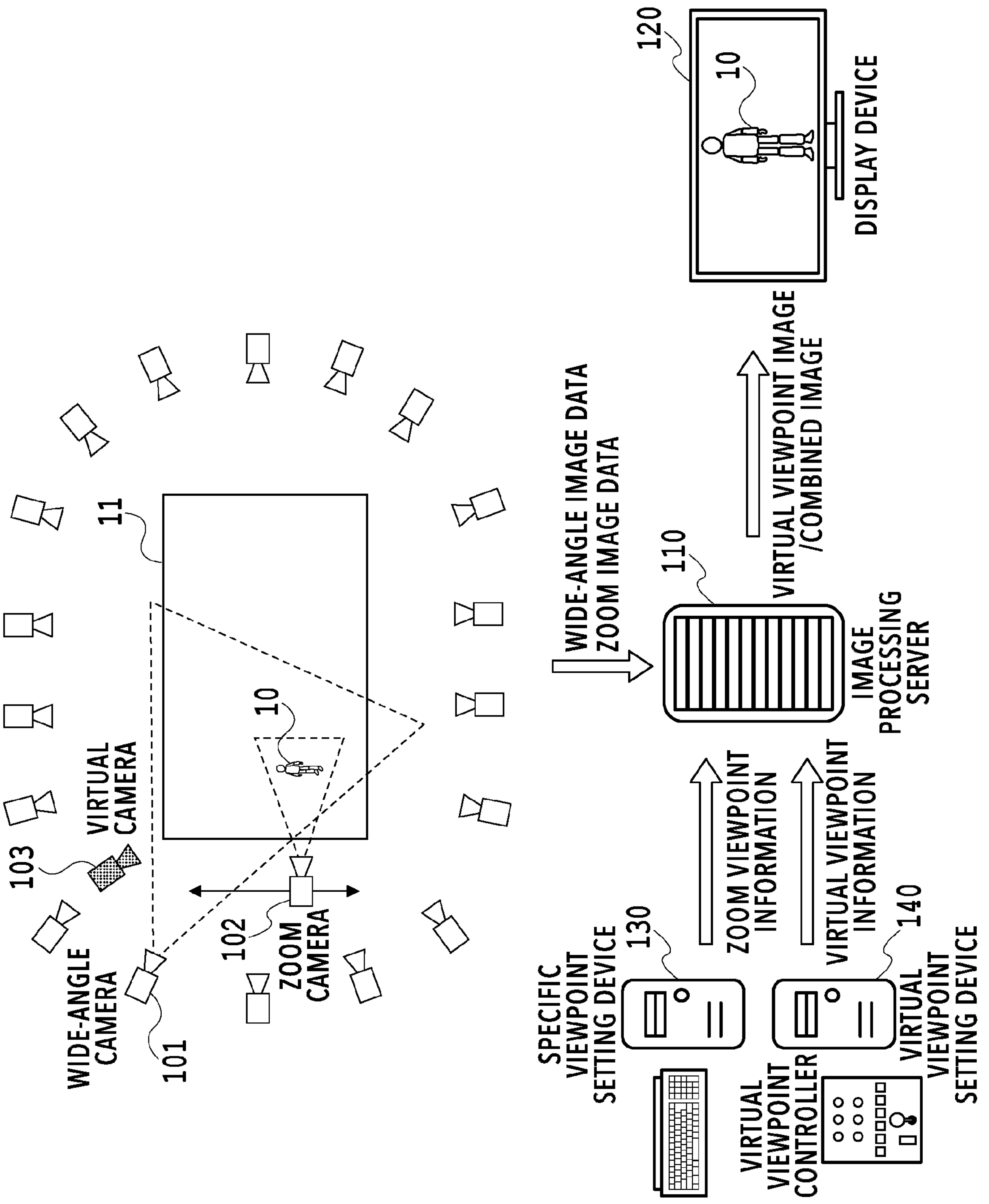
FIG. 1 is a diagram showing an example of a generation configuration of an image processing system.

Hereinafter, with reference to the attached drawings, the present disclosure is explained in detail in accordance with preferred embodiments. Configurations shown in the following embodiments are merely exemplary and the present disclosure is not limited to the configurations shown schematically.

In the present specification, the virtual viewpoint image is an image that is generated by a user and/or a dedicated operator or the like freely operating the position and orientation of a virtual camera in the image capturing space and also called a free-viewpoint image, an arbitrary viewpoint image and the like. In this case, the virtual camera means a virtual imaging device that does not exist actually in the image capturing space and is distinguished from an imaging device (actual camera) that exists in the image capturing space. Further, unless specified particularly, explanation is given by assuming that the term image includes both concepts of a moving image and a still image.

First Embodiment

<Explanation of Problem>

Generally, a system that generates a virtual viewpoint image generates shape data (generally called "3D model" and the like) representing a three-dimensional shape of an object from a plurality of captured images whose viewpoints are different, which is obtained by capturing the object from a variety of angles. In a case where the accuracy of the 3D model is reduced, the quality of a virtual viewpoint image that is generated based on the 3D model also deteriorates, and therefore, it is necessary to generate a highly accurate 3D model. In this regard, by increasing the number of installed actual cameras that capture an object, it is possible to improve the accuracy of the 3D model. Further, by increasing the image capturing range in the charge of each actual camera, it is also possible to reduce the number of installed cameras. However, in a case where image capturing is performed with a wider angle in order to increase the image capturing range per camera, the resolution of the captured image that is obtained is reduced. In this case, rendering (coloring) of the 3D model is performed by using texture whose resolution is low. Particularly, in a case where the virtual camera is set at a position close to the object, the resolution of the virtual viewpoint image is reduced. Here, in a case where the viewing angle of the actual camera is narrowed, it is possible to perform rendering by using texture whose resolution is high, and therefore, it is possible to control the resolution of the virtual viewpoint image from being reduced. However, in that case, it is necessary to increase the number of installed actual cameras by an amount corresponding to the narrowed viewing angle per actual camera. In this case, the total amount of data of captured images increases and it becomes necessary to augment the resources relating to the data transfer facilities and the image processing for generating a virtual viewpoint image. This is the problem desired to be solved by the present disclosure.

<System Configuration>

FIG. 1 is a diagram showing an example of the general configuration of the image processing system according to the present embodiment. The image processing system in FIG. 1 has a plurality of imaging devices 101, each of which obtains a long shot by performing image capturing from a position distant from an object, and one imaging device 102 that obtains an up shot by performing image capturing from a position close to the object. As shown schematically, each imaging device 101 is arranged at equal intervals around a field 11 as an image capturing-target area and the imaging device 102 is arranged movably at a position closer to the field 11. Then, based on the images captured by the imaging devices 101 and 102, a virtual viewpoint image representing an appearance from a virtual imaging device 103 that does not exist actually is generated in an image processing server 110 and a user views the virtual viewpoint image on a display device 120. In the following explanation, the imaging device 101 that obtains a long shot by performing image capturing with a wide angle from a position distant from the object is called "wide-angle camera" and the imaging device 102 that obtains an up shot by performing zoom-in image capturing from a position close to the object is called "zoom camera". Further, the virtual imaging device 103 that does not exist actually is called "virtual camera". In the following, each device configuring the image processing system according to the present embodiment, a relationship between devices, and the like are explained.

A person 10 is an object that constitutes the foreground in the virtual viewpoint image that is generated and which is the target of image capturing of the wide-angle camera 101 and the zoom camera 102. In the present embodiment, image capturing is performed by taking a person as a target, but the object that constitutes the foreground object may be an animal, a ball and the like other than a person. The number of foreground objects is not limited to one and there may exist a plurality of foreground objects in the image capturing space (here, the field 11).

Each wide-angle camera 101 is a device having a function to capture a video, such as a digital video camera. Similarly, the zoom camera 102 is a device having the function to capture a video, such as a digital video camera. Each of the wide-angle camera 101 and the zoom camera 102 performs synchronous image capturing based on a GPS or external synchronization signal. The data of the image of the long shot captured with a wide angle (in the following, described as "wide-angle image") and the image of the up shot captured with a zoom (in the following, described as "zoom image"), which are obtained by the synchronous image capturing, are transferred to the image processing server 110 via a network, not shown schematically. The installation positions and the number of cameras of the wide-angle cameras 101 and the zoom camera 102 are an example and not limited to those. For example, it may also be possible for the zoom camera 102 to be capable of moving in the direction parallel to the long side of the field 11 (in FIG. 1, in the left-right direction) or in the vertical direction, not only moving in the direction parallel to the short side of the field 11 (in FIG. 1, in the up-down direction) as shown in FIG. 1. Further, it may also be possible for the zoom camera 102 to have a function to adjust the enlargement/reduction ratio, pan, tilt and the like. Furthermore, in the present embodiment, the zoom camera 102 is installed at a position closer to the object, but it may also be possible to install the zoom camera 102 so that the zoom camera 102 performs image capturing from a position further from the object than the wide-angle camera 101. Still furthermore, the actual camera that is installed separately other than the wide-angle camera 101 may be a camera not mounting a so-called zoom lens and is only required to be a camera whose position (viewpoint), viewing angle and the like are different from those of the wide-angle camera 101.

The image processing server 110 is an image processing apparatus that generates a virtual viewpoint image and a combined image based on instructions from a virtual viewpoint setting apparatus 140 and a specific viewpoint setting apparatus 130 by using data of a wide-angle image group and the zoom image received via a network, not shown schematically. The virtual viewpoint image here is an image obtained by combining a foreground image obtained by applying appropriate colors (texture) to the shape data of the person 10 in a case where the person 10 is viewed from the virtual camera 103 and a background image generated separately. Further, the combined image is an image obtained by combining a foreground image obtained by cutting out the portion (foreground portion) corresponding to the person 10 from the zoom image of the up shot by the zoom camera 102 and a background image generated separately. Details of the functions of the image processing server 110 and the processing that is performed by the image processing server 110 will be described later.

The specific viewpoint setting apparatus 130 is an information processing apparatus, such as a PC and a tablet terminal. The specific viewpoint setting apparatus 130 of the present embodiment sets conditions and the like necessary for generating the above-described combined image based on instructions of a user and provides set contents to the image processing server 110. For example, a user designates the position of the zoom camera 102 (position of zoom viewpoint) and an arbitrary image area (clip area) within the above-described cutout-target zoom image by operating an input interface, such as a keyboard. Further, a user also designates the moving speed in a case of performing image capturing while moving the zoom camera 102, the playback speed of the combined image (for example, frame-by-frame advance (slow playback), reverse playback, fast playback (n-fold speed)), time information identifying the processing-target frame and the like. The information that is set based on the instructions of a user such as this is sent to the image processing server 110 via a network, not shown schematically. It may also be possible to generate a combined image automatically based on person tracking or a scenario created in advance in place of instructions of a user. In the following explanation, the information specifying the conditions for generating a combined image, which is set and provided by the specific viewpoint setting apparatus 130, is called "specific viewpoint information (zoom viewpoint information)".

The virtual viewpoint setting apparatus 140 is an information processing apparatus, such as a PC and a tablet. The virtual viewpoint setting apparatus 140 of the present embodiment sets information (virtual viewpoint information) specifying the position, the orientation and the like of the virtual camera 103, which is necessary for generating a virtual viewpoint image, and provides the information to the image processing server 110. A user designates the generation conditions of a virtual viewpoint image, such as the position, orientation (line-of-sight direction), viewing angle, moving speed, playback speed, and time information, of the virtual camera 103 by operating a virtual viewpoint controller comprising a joystick and the like. The virtual viewpoint information that is set based on instructions of a user is sent to the image processing server 110 via a network, not shown schematically. As in the case of the zoom viewpoint information described above, it may also be possible to generate virtual viewpoint information automatically based on person tracking or the scenario created in advance in place of instructions of a user.

The display device 120 is, for example, a liquid crystal monitor, a project or the like and outputs image data and voice data output by the image processing server 110.

The network that is used in the image processing system may be a wired network using a coaxial cable, such as a LAN cable, an optical cable, and an SID, or may be a wireless network, such as Wi-Fi. Further, it may also be possible to perform data communication using networks whose type is different between devices.

<Software Configuration of Image Processing Server>

Figure 2A:
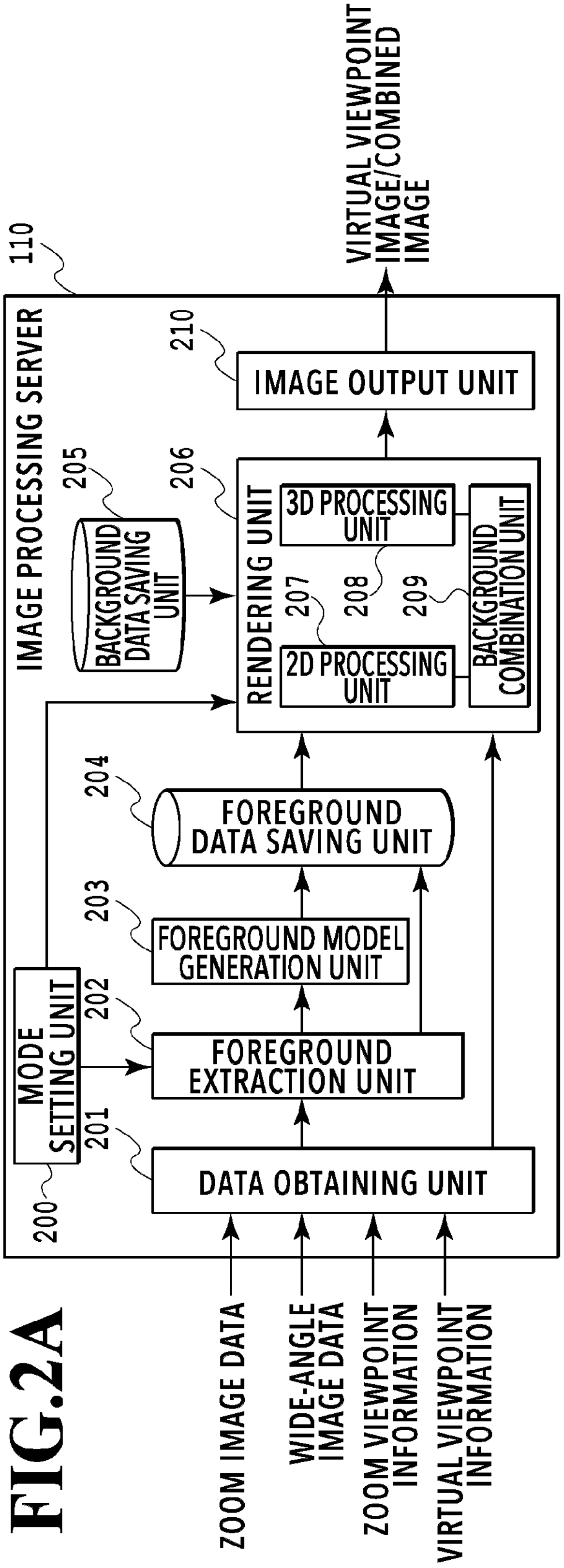
FIG. 2A is a block diagram showing a software configuration of an image processing server and FIG. 2B is a block diagram showing a hardware configuration of the image processing server.

Next, the software configuration of the image processing server 110 is explained. FIG. 2A is a block diagram showing the software configuration of the image processing server 110. The image processing server 110 has a mode setting unit 200, a data obtaining unit 201, a foreground extraction unit 202, a foreground model generation unit 203, a foreground data saving unit 204, a background data saving unit 205, a rendering unit 206, and an image output unit 210. In the following, the function of each unit is explained.

The mode setting unit 200 sets the operation mode in which a virtual viewpoint image is generated real time or the operation mode in which a virtual viewpoint image is generated non-real time based on instructions of a user. The user sets the operation mode in advance via a UI screen or the like, not shown schematically, before starting the generation of a virtual viewpoint image. Whether the operation mode that is set here is "real time" or "non-real time" relates to whether or not to perform foreground extraction processing for the zoom image from the zoom camera 102. Specifically, the foreground extraction processing for the zoom image is performed only in the case where the virtual viewpoint image is generated non-real time and in the case where the virtual viewpoint image is generated real time, the foreground extraction processing for the zoom image is omitted. As described above, by switching between performing the foreground extraction processing and not performing the foreground extraction processing in accordance with the set operation mode, it is possible to reduce the processing load at the time of real-time generation and improve the accuracy of the foreground model at the time of non-real-time generation.

The data obtaining unit 201 receives and obtains the image data (video frame) that is transmitted from the wide-angle camera 101 and the zoom camera 102 and the viewpoint information that is transmitted from the specific viewpoint setting apparatus 130 and the virtual viewpoint setting apparatus 140.

The foreground extraction unit 202 performs the foreground extraction processing to extract the portion of the object (foreground object) that is taken to be the foreground from the captured image of each frame constituting the image data that is input from the data obtaining unit 201 in accordance with the contents of the operation mode that is set by the mode setting unit 200. To the image data that is transmitted from the wide-angle camera 101 and the zoom camera 102, the time code at the time of image capturing is appended. The foreground extraction unit 202 refers to the time code and extracts the image area corresponding to the shape of the foreground object captured in the captured image from the captured image corresponding to the frame at the time designated in zoom designation information and virtual viewpoint information. As the method of extracting a foreground object, for example, there is a background difference method. The background difference method is a method in which the background image obtained in advance by performing image capturing in the state where the foreground object does not exist and the captured image obtained by performing image capturing in the state where the foreground object exists are compared and the area whose difference value is larger than a threshold value is taken to be the foreground. As the method of extracting a foreground, there are a variety of methods other than the background difference method, such as an interframe difference method, and it may be possible to apply any method. Then, the foreground extraction unit 202 generates a binary image (silhouette image) in which the image area corresponding to the extracted foreground object and the image area corresponding to the non-object other than the foreground object are represented respectively by "1" or "0". It may also be possible to generate the silhouette image in the format of a multi-valued image in which it is possible to alpha-blend the boundary between the portion of the foreground object and the other portion. The data of the generated silhouette image is output to the foreground model generation unit 203 along with the time code information. That is, to each silhouette image that is created for each frame, a time code indicating to which frame the silhouette image corresponds is appended and then the data of the silhouette image is delivered to the foreground model generation unit 203.

The foreground model generation unit 203 generates a 3D model (foreground model), which is shape data representing the three-dimensional shape of the object, based on the silhouette image generated by the foreground extraction unit 202 and the camera parameters of each of the actual cameras 101 and 102. Here, the camera parameters include external parameters and internal parameters. The external parameters are parameters (for example, rotation matrix, position vector and the like) indicating the position and orientation of the imaging device. The internal parameters are parameters indicating the characteristics of the optical system inherent in the imaging device, for example, such as the focal length, the image center, and the lens distortion. It may also be possible to save the camera parameters in advance, which are obtained by performing calibration before starting image capturing, in the auxiliary storage device 214 or the like, or to obtain from each actual camera each time as additional information on the wide-angle image and the zoom image. For the generation of the foreground model, for example, the method, such as the visual hull method, is used. As the algorithm of the visual hull method in which the common portion of the cones viewed from the image capturing viewpoint of each actual camera is taken to be the desired foreground model, there are VIM (Volume Intersection Method) and SCM (Space Carving Method). In the present embodiment, SCM is used. In SCM, the foreground model is obtained by, in a case where each individual unit cube (called "voxel") in the three-dimensional space is back projected to the camera coordinate system of each actual camera, leaving only the voxels that remain inside the foreground object and deleting the other voxels. To the foreground model obtained in this way, information indicating the position in the three-dimensional space at which each actual camera has performed image capturing is also appended. In the present embodiment, the foreground model is represented in the voxel format, but the foreground model may be represented in the point cloud format or in the mesh format. Further, the foreground model generation unit 203 generates texture information (in the following, called "foreground texture") for coloring the foreground model. This foreground texture is obtained, for example, by determining the color of each unit cube constituting the foreground model using the pixel values (RGB values) of the captured image of the actual camera whose line-of-sight direction is close to that of the virtual camera.

The foreground data saving unit 204 saves each piece of data of the captured image that is transmitted from the wide-angle camera 101 and the zoom camera 102, the silhouette image that is generated by the foreground extraction unit 202, and the foreground model and the foreground texture that are generated by the foreground model generation unit 203.

The background data saving unit 205 saves the data of the background mode that is the shape data representing the three-dimensional shape of the object (background object), which is taken as the background in the virtual viewpoint image, and the texture information (in the following, described as "background texture") for coloring the background model. The background model may a fixed model or a model whose shape changes over time. The background texture is obtained by determining the color of each unit cube constituting the background model using the pixel values (RGB values) of the captured image of the wide-angle camera 101 capable of capturing the background model.

The rendering unit 206 has a 2D processing unit 207, a 3D processing unit 208, and a background combination unit 209. These units generate a viewpoint image based on virtual viewpoint information or a combined image based on zoom viewpoint information by cooperating with one another. Details of the generation of the virtual viewpoint image and the combined image will be described later.

The image output unit 210 outputs the data of the virtual viewpoint image and the combined image generated by the rendering unit 206 to the display device 120. It is possible for the image output unit 210 to output the virtual viewpoint image or the combined image by selectively switching therebetween, and it is also possible to output both to the same display device or different display devices. Further, the image output unit 210 outputs the rendering results of each of them to the specific viewpoint setting apparatus 130 and the virtual viewpoint setting apparatus 140. That is, it is possible for a user who operates the specific viewpoint setting apparatus 130 and the virtual viewpoint setting apparatus 140 to perform the operation for the next designation while referring to the virtual viewpoint image and the combined image generated based the zoom viewpoint information and the virtual viewpoint information designated by the user him/herself. The image processing server 110 of the present embodiment processes and outputs image data dedicatedly but may have a function to output voice data as well, such as peripheral sound collected at the same time.

It may also be possible for another information processing apparatus to comprise part of each function block described above comprised by the image processing server 110. For example, it may also be possible for a certain image processing server to perform the function up to the generation of the foreground model and for another image processing server to be in charge of the function of rendering and subsequent functions. Alternatively, a configuration may be accepted in which the functions are divided into the functions of the 2D processing unit 207 and the functions of the 3D processing unit 208 of the rendering unit 206 and different image processing servers are caused to be in charge of the functions of the 2D processing unit 207 and the functions of the 3D processing unit 208, respectively, and the processing is performed in parallel.

<Hardware Configuration of Image Processing Server>

Figure 2B:
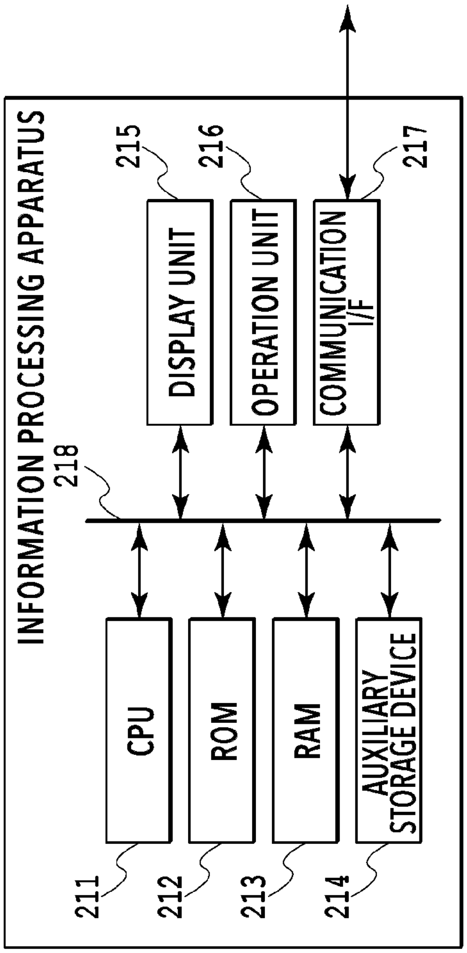

The hardware configuration of the image processing server 110, which is an information processing apparatus, is explained by using FIG. 2B. The specific viewpoint setting apparatus 130 and the virtual viewpoint setting apparatus 140, which are each similarly an information processing apparatus, have the same hardware configuration.

The image processing server 110 has a CPU 211, a ROM 212, a RAM 213, an auxiliary storage device 214, a display unit 215, an operation unit 216, a communication I/F 217, and a bus 218.

The CPU 211 implements each function of the image processing server 110, which is shown in FIG. 2B described previously, by controlling the entire image processing server 110 using computer programs and data stored in the ROM 212 and the RAM 213. It may also be possible for the image processing server 110 to have one piece or a plurality of pieces of dedicated hardware different from the CPU 211 and the dedicate hardware may perform at least part of the processing that is performed by the CPU 211. As the example of the dedicated hardware, there are an ASIC (Application Specific Integrated Circuit), FPGA (Field Programmable Gate Array), DSP (Digital Signal Processor) and the like. The ROM 212 stores programs and the like that do not need to be changed. The RAM 213 temporarily stores programs and data supplied from the auxiliary storage device 214, data supplied from the outside via the communication I/F 217, and the like. The auxiliary storage device 214 includes, for example, a hard disk drive and the like and stores various kinds of data, such as image data and voice data.

The display unit 215 includes, for example, a liquid crystal display, an LED and the like and displays a GUI (Graphical User Interface) for a user to operate the image processing server 110, and the like. The operation unit 216 includes, for example, a keyboard, a mouse, a joystick, a touch panel and the like and inputs various instructions to the CPU 211 upon receipt of the operation by a user. The CPU 211 operates as a display control unit configured to control the display unit 215 and an operation control unit configured to control the operation unit 216.

The communication I/F 217 is used for communication with an external device of the image processing server 110. For example, in a case where the image processing server 110 is connected with an external device by wire, a communication cable is connected to the communication I/F 217. In a case where the image processing server 110 has a function to wirelessly communicate with an external device, the communication I/F 217 comprises an antenna. The bus 218 connects each unit of the image processing server 110 and transmits information.

Explanation is given on the assumption that the display unit 215 and the operation unit 216 are internal configurations, but it may also be possible for each of them to exist as another device outside the image processing server 110.

<Generation Processing of Virtual Viewpoint Image>

Figure 3:
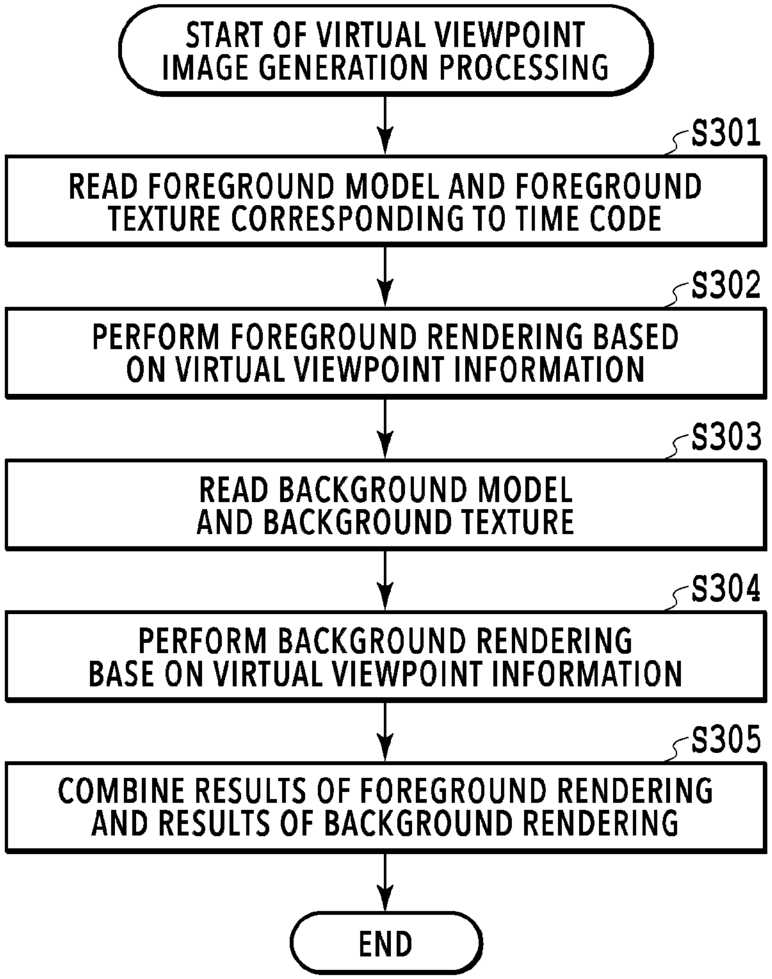
FIG. 3 is a flowchart showing a flow of generation processing of a virtual viewpoint image.

Next, the generation of a virtual viewpoint image in the rendering unit 206 is explained with reference to the flowchart in FIG. 3. The flow in FIG. 3 starts to be performed by the virtual viewpoint information and the captured image data by each of the actual cameras 101 and 102 being obtained by the data obtaining as a trigger. In the following explanation, symbol "S" means a step.

At S301, the 3D processing unit 208 reads the data of the foreground model and the foreground texture with the designated time code from the foreground data saving unit 204 based on the time information within the input virtual viewpoint information.

At S302, the 3D processing unit 208 performs rendering in accordance with the camera parameters of the virtual camera, which are included in the virtual viewpoint information, by using the read data of the foreground model and the foreground texture. In more detail, the 3D processing unit 208 performs processing (coloring processing) to project the foreground model arranged in the three-dimensional space onto the virtual screen on the two-dimensional plane of the virtual camera and paste the foreground texture to the projected foreground model. Due to this, the foreground image representing the foreground portion in a case where the foreground object is viewed from the virtual camera.

At S303, the 3D processing unit 208 reads the data of the background model and the background texture from the background data saving unit 205.

At S304, the 3D processing unit 208 performs rendering in accordance with the camera parameters of the virtual camera included in the virtual viewpoint information by using the read data of the background model and the background texture. The procedure of the specific processing is the same as that at S302. Due to this, the background image representing the background portion in a case where the background object is viewed from the virtual camera.

At S305, the background combination unit 209 combines the foreground image, which is the rendering results at S302, and the background image, which is the rendering results at S304. Due to this, the virtual viewpoint image corresponding to the virtual viewpoint information is obtained.

<Generation Processing of Combined Image>

Figure 4:
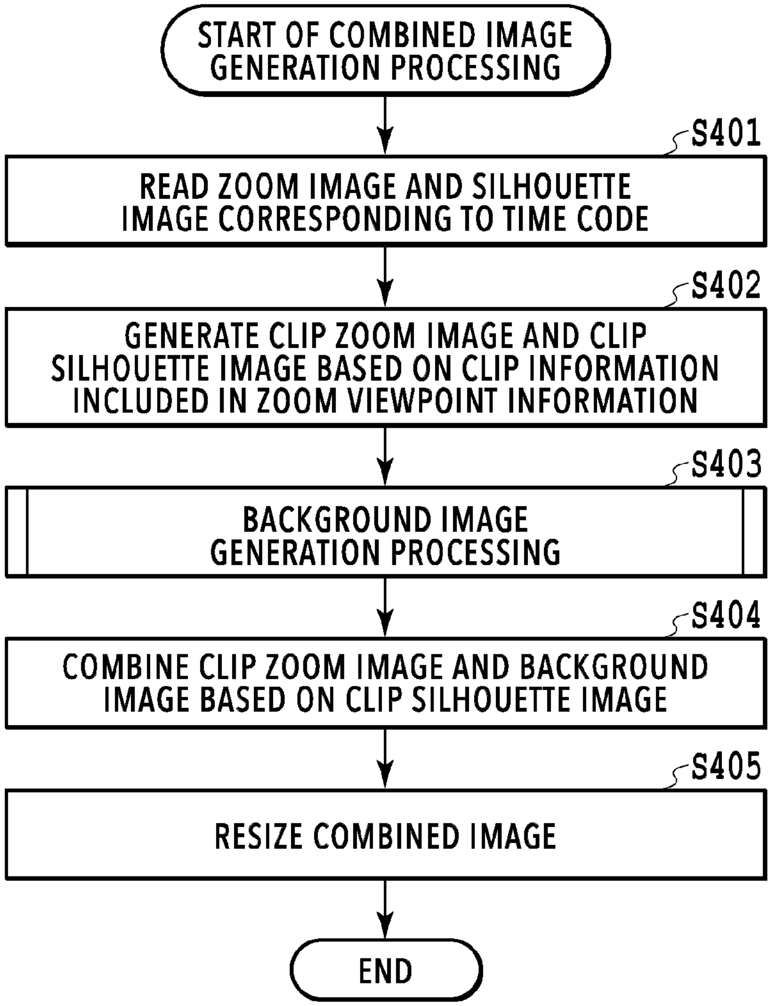
FIG. 4 is a flowchart showing a flow of generation processing of a combined image.

Next, the generation of a combined image in the rendering unit 206 is explained with reference to the flowchart in FIG. 4. The execution of the flow in FIG. 4 is started with the zoom viewpoint information and the captured image data by the zoom camera 10 being obtained by the data obtaining unit 201 as a trigger. In the following explanation, symbol "S" means a step.

At S401, the 2D processing unit 207 reads the data of the zoom image and the silhouette image with the designated time code from the foreground data saving unit 204 based on the time information within the input zoom viewpoint information.

Figure 5:
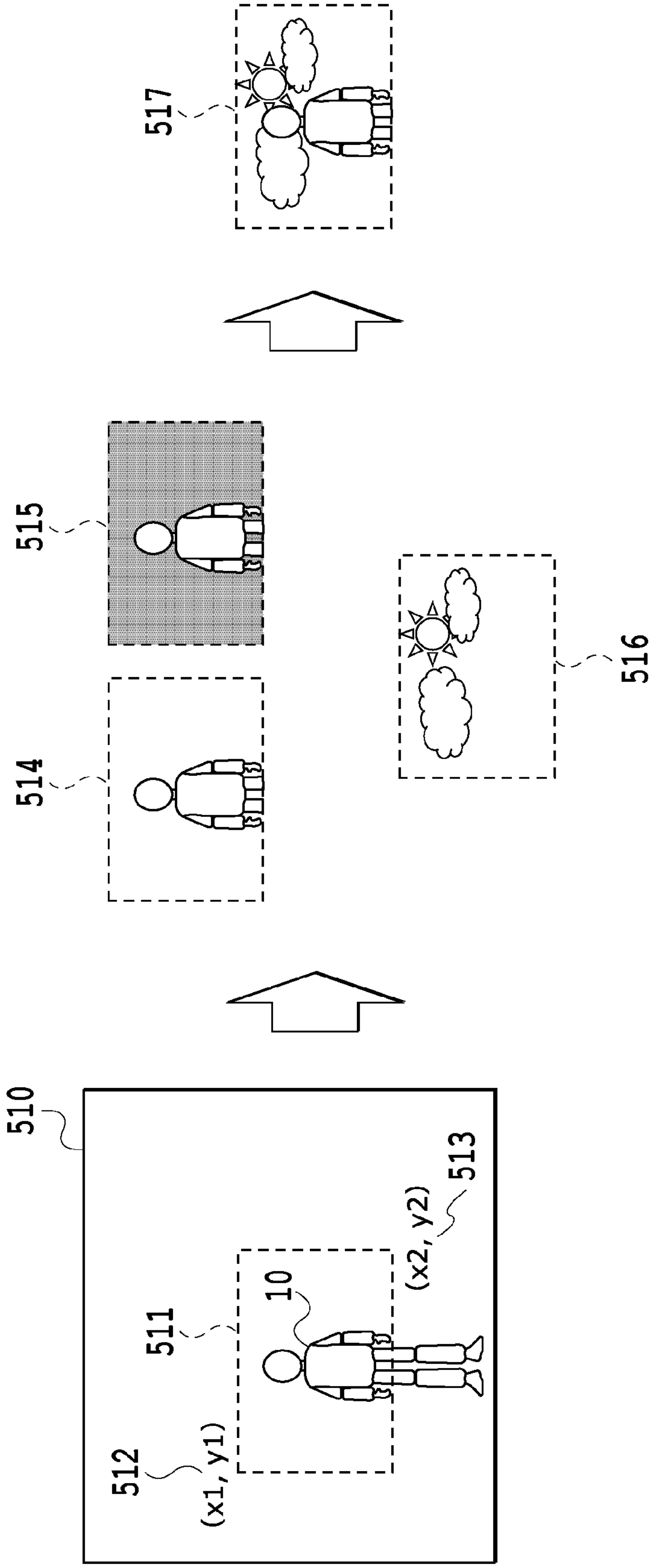
FIG. 5 is a diagram explaining a generation process of a combined image.

At S402, the 2D processing unit 207 performs clipping processing (cutout processing) for each of the zoom image and the silhouette image read at S401 based on clip information (cutout area information) included in the zoom viewpoint information. Here, the clipping processing is explained by using a specific example. Here, in FIG. 5, a solid-line frame 510 indicates a processing-target zoom image and a broken-line frame 511 inside thereof indicates a clip area. The clip area 511 is an image area specified by the position coordinates of the starting point and the endpoint represented by the clip information, specifically, by (x1, y1) indicating a top-left position 512 and (x2, y2) indicating a bottom-right position 513. From the silhouette image as well, the image area corresponding to the clip information is cut out. In FIG. 5, a broken-line frame 514 indicates the partial image (in the following, described as "clip zoom image") cut out from the zoom image and a broken-line frame 515 indicates the partial image (in the following, described as "clip silhouette image") cut out from the silhouette image. By the clipping processing for the zoom image and the silhouette image, the clip zoom image and the clip silhouette image described above are obtained. The clip information is not limited to the position coordinates of the starting point and the endpoint and for example, the clip information may be a combination of the coordinates (x1, y1) indicating the starting point position and the information on the width (w) and the height (h) of the image area.

Figure 6:
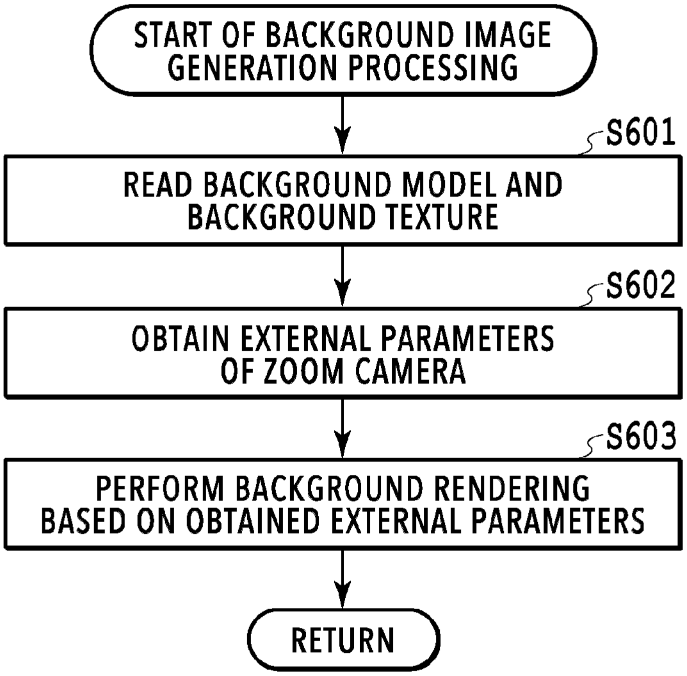
FIG. 6 is a flowchart showing details of background image generation processing.

At S403, the 3D processing unit 208 generates the background image by performing rendering processing using the data of the background model and the background texture. FIG. 6 is a flowchart showing details of the background image generation processing at this step. In the following, explanation is given with reference to the flow in FIG. 6.

<<Background Image Generation Processing>>

At S601, the 3D processing unit 208 reads the data of the background model and the background texture from the background data saving unit 205.

At S602, the 3D processing unit 208 reads and obtains the camera parameters of the zoom camera 102 from the auxiliary storage device 214. It may also be possible to obtain the camera parameters as additional information on the zoom image.

At S603, the 3D processing unit 208 performs rendering in accordance with the camera parameters of the zoom camera 102 obtained at S602 by using the data of the background model and the background texture read at S601. The procedure of specific processing is the same as that at S302 and S304 described previously. Due to this, the background image is obtained, which represents the background portion in a case where the background object is viewed from the zoom camera with the viewing angle corresponding to the clip area. In FIG. 5, a broken-line frame 516 shows an example of the background image obtained at this step.

The above is the contents of the background image generation processing in the generation processing of the combined image. Explanation is returned to the flow in FIG. 4.

At S404, the background combination unit 209 combines the clip zoom image obtained at S402 and the background image obtained at S403 based on the clip silhouette image obtained at S402. Due to this, the combined image of a high image quality, which captures the foreground object with the zoom camera 102, is obtained. In FIG. 5, a broken-line frame 517 indicates an example of the combined image obtained at this step.

At S405, the background combination unit 209 resizes the combined image generated at S404 as needed. The size of the combined image obtained by the processing up to S404 is small because part of the original captured image is cut out by the clipping processing (see FIG. 5). Consequently, the processing to enlarge the combined image or the like is performed as needed so that the size thereof becomes the image size designated as the image size at the time of output. The above is the contents of the combined image generation processing.

<Switching Processing of Output Image>

Figure 7:
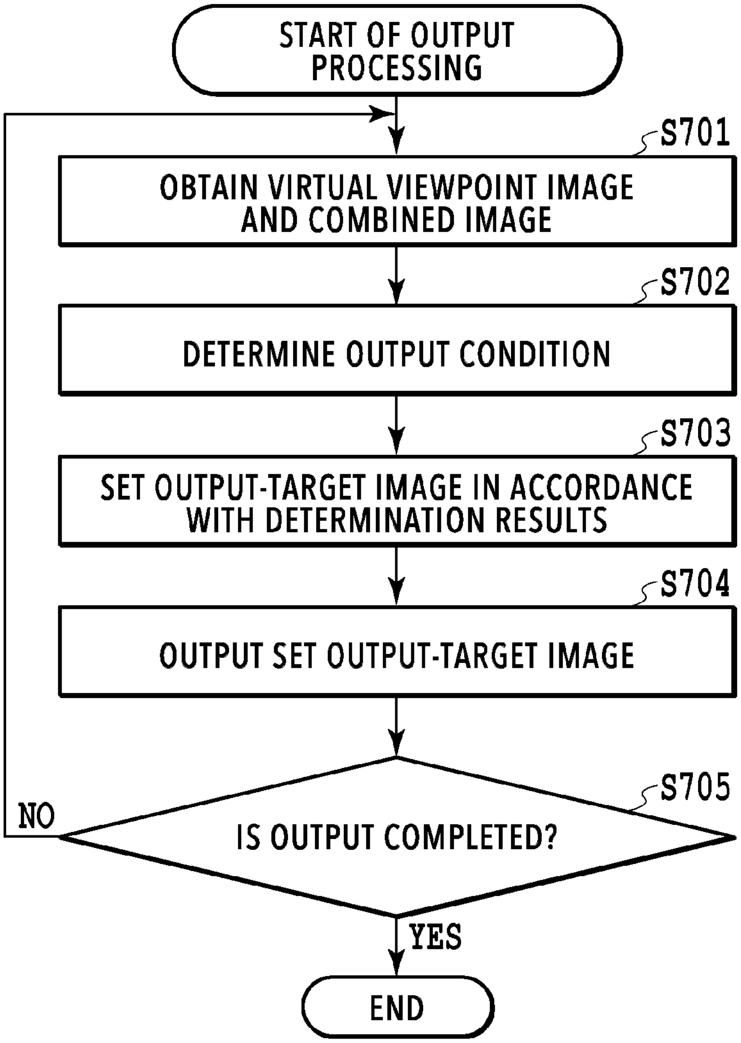
FIG. 7 is a flowchart showing a flow of output image switching processing.

Following the above, the processing to selectively switch between the virtual viewpoint image and the combined image generated in the rendering 206 and output the image to the display device 120 by the image output unit 210 is explained along the flowchart in FIG. 7. In the following explanation, symbol "S" means a step.

At S701, from the rendering unit 206, the virtual viewpoint image and the combined image are input. At S702 that follows, the output condition that is set in advance is determined. Then, at S703, in accordance with the determination results, one of the virtual viewpoint image and the combined image is set as the output target. Then, at S704, the image that is set as the output target is output. The above is the contents of the selective switching output control in the image output unit 210. As specific examples of output conditions, mention is made of the following.

<<Instructions of User>>

A switching method based on an operation signal of a user via a client terminal and the like, not shown schematically. For example, in a case where the total time of a video is 1 minute, outputs are switched based on instructions of a user, such as that the virtual viewpoint image is output for 30 seconds in the first half and the combined image is output for 30 seconds in the second half <<Distance Between Virtual Camera and Foreground Object>>

A switching method in accordance with the distance between the virtual camera identified by the virtual viewpoint information and the foreground object. In the rendering at the time of generating a virtual viewpoint image, the coloring for the foreground model is performed by using the wide-angle image captured by the wide-angle camera 101. In the wide-angle image, the foreground object is captured small, and therefore, the resolution of texture is relatively low. Because of this, in a case where the distance between the virtual camera and the foreground object is too short, the lowness of the resolution in the virtual viewpoint image is conspicuous. Consequently, in a case where the distance between the virtual camera and the foreground object is within a threshold value, the combined image is output. It may also be possible to give a predetermined notification to a user who sets the virtual camera so that a predetermined distance or more to the foreground object is maintained in place of switching the outputs. For example, in a case where the virtual camera is set in a position relationship in which the distance between the virtual camera and the foreground object is within a predetermined distance, a warning message is displayed on the UI screen of the virtual viewpoint setting device 140, and so on.

<<Presence/Absence of Foreground Object>>

A Switching method based on the way of thinking that priority is given to the image in which the foreground object is captured. First, in a case where both the images are generated, the combined image whose image quality is relatively high is selected and output. In that state, in a case where the foreground object is no longer captured in the zoom image and it is no longer possible to generate a combined image that captures the foreground object from a close position, it may be possible to switch the combined image to the virtual viewpoint image generated based on the wide-angle image that captures the foreground object from a distant position. Then, in a case where the foreground object is captured again in the zoom image and it is possible to generate a combined image that captures the foreground object from a close position, it may be possible to switch again to the combined image from the virtual viewpoint image generated based on the wide-angle image. Further, in a case where the foreground object is a specific object (for example, person), on a condition that a zoom image that matches the composition determined in advance, such as that the specific region (for example, the front face) is captured, is obtained, it may be possible to select and output the combined image.

<<Other Output Conditions>>

In addition, it may also be possible to set a condition under which switching to the combined image is performed in a case where the viewing angle designated in the virtual viewpoint information becomes close to the viewing angle of the zoom camera 102. Further, it may also be possible not to perform switching in a case where the difference in the resolution is large between the virtual viewpoint image and the combined image. For example, it is assumed that in a case where a user outputs a video whose total time is 10 seconds, the user performs the setting manually that the virtual viewpoint image is output for five seconds in the first half and the combined image is output for five seconds in the second half. In this case, on a condition that the difference in the resolution (difference in viewing angle) between both the images exceeds a threshold value, it may be possible to perform control so that the virtual viewpoint image is continued to be output also for five seconds in the second half without performing switching to the combined image.

Although explanation is given on the premise that switching of output images is performed, in a case where the two or more display devices 120 exist, it may also be possible to output one of the virtual viewpoint image and the combined image to each display device 120 and cause both the display devices 120 to display the different images. Alternatively, it may also be possible to output both the virtual viewpoint image and the combined image to the one display device 120 and cause the display device 120 to display both the images by screen division.

As above, in the present embodiment, the images that are output are switched between, for example, a case where the position of the virtual camera is distant from the foreground object and a case where the position is close to the foreground object. Due to this, it is possible to prevent a viewer from recognizing the deterioration of the resolution. Further, according to the present embodiment, it is made possible to provide an image in which the image quality is secured to a viewer without the need to considerably increase the number of actual cameras or augment the network.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to provide an appropriate image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-036404, filed Mar. 9, 2022 which is hereby incorporated by reference wherein in its entirety.

What is claimed is:

1. An image processing apparatus comprising:

one or more memories storing instructions; and one or more processors executing the instructions to:

generate a foreground clip image by clipping a captured area of a foreground object from a captured image obtained by a specific imaging device performing image capturing;

obtain foreground shape data that is generated based on a plurality of captured images obtained by a plurality of imaging devices that perform image capturing, the foreground shape data indicating a three-dimensional shape of the foreground object;

generate a virtual viewpoint image representing an appearance of the foreground object from a virtual viewpoint in a virtual space based on the foreground shape data;

generate a background image, based on pre-prepared background shape data indicating a three-dimensional shape of a background object, the background image representing an appearance of the background object from a viewpoint corresponding to the specific imaging device in the virtual space; and selectively output at least one of a first image and a second image, wherein the first image is an image generated by combining the foreground image and the background image and then resizing the combined image, the foreground shape data is not used for the generation of the first image, and wherein the second image is an image generated based on the virtual viewpoint image and the background image.

2. The image processing apparatus according to claim 1, wherein a viewing angle of the specific imaging device is smaller than a viewing angle of at least one imaging device included in the plurality of imaging devices.

3. The image processing apparatus according to claim 1, wherein the one or more processors execute the instructions to:

set an operation mode in which a virtual viewpoint image is generated real time or an operation mode in which a virtual viewpoint image is generated non-real time, wherein in a case where the operation mode in which a virtual viewpoint image is generated real time is set, a plurality of foreground images obtained from a plurality of captured images, respectively, corresponding to a plurality of imaging devices not including the specific imaging device are used to generate the foreground shape data, and in a case where the operation mode in which a virtual viewpoint image is generated non-real time is set, a plurality of foreground images obtained from a plurality of captured images, respectively, corresponding to a plurality of imaging devices including the specific imaging device are used to generate the foreground shape data.

4. The image processing apparatus according to claim 1, wherein outputting the first image and outputting the second image are switched based on instructions of a user.

5. The image processing apparatus according to claim 1, wherein whether to output the first image or output the second image is determined based on a distance between the virtual viewpoint and the foreground object.

6. The image processing apparatus according to claim 5, wherein in a case where a distance between the virtual viewpoint and the foreground object is within a threshold value, it is determined that the first image is output.

7. The image processing apparatus according to claim 1, wherein in a case where an area of the foreground object is included in a captured image obtained by the specific imaging device performing image capturing, the first image is output.

8. The image processing apparatus according to claim 7, wherein in a case where a specific portion of the foreground object is included in a captured image obtained by the specific imaging device performing image capturing, the first image is output.

9. The image processing apparatus according to claim 8, wherein in a case where a front face of a person who is the foreground object is included in a captured image obtained by the specific imaging device performing image capturing, the first image is output.

10. The image processing apparatus according to claim 1, wherein in a case where an area of the object foreground is not included in a captured image obtained by the specific imaging device performing image capturing, the second image is output.

11. The image processing apparatus according to claim 1, wherein the one or more processors execute the instructions to:

give a notification to a user who sets a virtual viewpoint in a case where a distance between the virtual viewpoint and the foreground object is within a threshold value.

12. An image processing method comprising the steps of:

generating a foreground clip image by clipping a captured area of a foreground object from a captured image obtained by a specific imaging device performing image capturing;

obtaining foreground shape data that is generated based on a plurality of captured images obtained by a plurality of imaging devices that perform image capturing, the foreground shape data indicating a three-dimensional shape of the foreground object;

generating a virtual viewpoint image representing an appearance of the foreground object from a virtual viewpoint in a virtual space based on the foreground shape data;

generating a background image, based on pre-prepared background shape data indicating a three-dimensional shape of a background object, the background image representing an appearance of the background object from a viewpoint corresponding to the specific imaging device in the virtual space;

selectively outputting at least one of a first image and a second image, wherein the first image is an image generated by combining the foreground image and the background image and then resizing the combined image, the foreground shape data is not used for the generation of the first image, and wherein the second image is an image generated based on the virtual viewpoint image and the background image.

13. A non-transitory computer readable storage medium storing a program for causing a computer to perform an image processing method comprising the steps of:

generating a foreground clip image by clipping a captured area of a foreground object from a captured image obtained by a specific imaging device performing image capturing;

obtaining foreground shape data that is generated based on a plurality of captured images obtained by a plurality of imaging devices that perform image capturing, the foreground shape data indicating a three-dimensional shape of the foreground object;

generating a virtual viewpoint image representing an appearance of the foreground object from a virtual viewpoint in a virtual space based on the foreground shape data;

generating a background image, based on pre-prepared background shape data indicating a three-dimensional shape of a background object, the background image representing an appearance of the background object from a viewpoint corresponding to the specific imaging device in the virtual space;

selectively outputting at least one of a first image and a second image, wherein the first image is an image generated by combining the foreground image and the background image and then resizing the combined image, the foreground shape data is not used for the generation of the first image, and wherein the second image is an image generated based on the virtual viewpoint image and the background image.

* * * * *